(12) United States Patent
Hue

(10) Patent No.: US 7,028,119 B2
(45) Date of Patent: Apr. 11, 2006

(54) AUTOMATED TOOL FOR DETECTION OF POTENTIAL RACE CONDITION

(75) Inventor: Vincent Hue, Vannes (FR)

(73) Assignee: Wind River Systems, Inc., Alameda, CA (US)

( * ) Notice: Subject to any disclaimer, the term of this patent is extended or adjusted under 35 U.S.C. 154(b) by 1041 days.

(21) Appl. No.: 09/825,815

(22) Filed: Apr. 4, 2001

(65) Prior Publication Data

US 2003/0056149 A1 Mar. 20, 2003

(51) Int. Cl.
*G06F 12/00* (2006.01)
*G06F 9/44* (2006.01)
*G06F 11/00* (2006.01)

(52) U.S. Cl. ............ 710/200; 717/124; 717/714; 717/38

(58) Field of Classification Search ........... 710/200, 710/124, 126, 141–143; 714/35, 37, 38; 703/22
See application file for complete search history.

(56) References Cited

U.S. PATENT DOCUMENTS 6,343,371 B1 * 1/2002 Flanagan et al. .......... 717/124
6,817,009 B1 * 11/2004 Flanagan et al. .......... 717/126
6,851,075 B1 * 2/2005 Ur et al. .................... 714/36

OTHER PUBLICATIONS

Eraser: A Dynamic Data Race Detector for Multi-Threaded Programs, Savage et al.*
Intel Thread Checker for Windows, Product Overview, 2004.*
Warlock, A Static Data Race Analysis Tool, Nicholas Sterling, USENIX Winter 1993 Conference Proceedings, Jan. 1993.*
What are race conditions? Some Issues and Formulations, Netzer et al., Mar. 1992.*

* cited by examiner

*Primary Examiner*—Khanh Dang
(74) *Attorney, Agent, or Firm*—Davidson, Davidson & Kappel, LLC

(57) ABSTRACT

A method for detecting a potential race condition is provided comprising the steps of identifying a memory access in a source code segment, the source code segment being executable in any one of a plurality of execution threads; searching backward from the memory access through each of the plurality of threads for an assert protection declaration without any intervening deassert protection declaration, and identifying the potential race condition if the assert protection declaration without any intervening deassert protection declaration was not found in each of the plurality of threads; and searching forward from the memory access through each of the plurality of threads for the deassert protection declaration, and identifying the potential race condition if the deassert protection declaration was not found in each of the plurality of threads.

38 Claims, 9 Drawing Sheets

AUTOMATED TOOL FOR DETECTION OF POTENTIAL RACE CONDITION

BACKGROUND INFORMATION

A race condition is an anomalous behavior due to unexpected critical dependence on the relative timing of events. For example, if one process writes to a shared resource while another process is reading from the same location, then the data read may be the old contents, the new contents, or some mixture of the two depending on the relative timing of the read and write operations. Race conditions also develop when shared resources are accessed by more than one thread of execution, and at least one of the threads modifies the shared resource.

Synchronization mechanisms, such as semaphores, mutexes, task locks, and interrupt locks, control access to the shared resources and allow for mutual exclusion. An interrupt lock guarantees a task exclusive access to the CPU by disabling interrupts, however, it prevents the system from responding to external events for the duration of the lock. Task locks prevent other tasks from preempting the current task, but allow interrupt service requests (ISRs) to issue. However, task locks can lead to unacceptable real time responses, as tasks of higher priority are unable to execute until the locking task leaves the critical region. Semaphores provide for mutual exclusion of data with finer granularity than either interrupt service requests or task locks and coordinate a task's execution with external events. Since the synchronization mechanisms are difficult to implement and a small error in coding can create a race condition, source code should be checked to determine if the synchronization mechanisms have been properly implemented.

Although race conditions can be checked for by manually inspecting the source code, this is a difficult and time consuming task. Moreover, with large amounts of source code manual inspection is not feasible.

Yet another way to check for race conditions is by run-time detection, which analyzes the execution profile of a program. In order to analyze the execution profile of a program, difficult to use instrumentation and/or hardware probes are needed.

SUMMARY

In accordance with a first embodiment of the present invention, a system and method for detecting a potential race condition is provided. A memory access is identified in a source code segment which is executable in any one of a plurality of execution threads. The system then searches backward from the memory access through each of the plurality of threads for an assert protection declaration without any intervening deassert protection declaration. If the assert protection declaration without any intervening deassert protection declaration was not found in each of the plurality of threads, a potential race condition is identified. The system also searches forward from the memory access through each of the plurality of threads for a deassert protection declaration, and identifies the potential race condition if the deassert protection declaration was not found in each of the plurality of threads.

In accordance with another embodiment of the present invention, the source code can be viewed as including a plurality of source code segments, and a first source code segment containing a desired memory access can be viewed as a node interconnecting a first tree and a second tree. Each source code segment, except the first source code segment, can then be viewed as arranged either in the first tree as an ancestor of the first code segment or in the second tree as a descendant of the first code segment. The system and method for detecting a potential race condition in accordance with this embodiment includes the steps of: (a) identifying a memory access in the first source code segment of the plurality of source code segments, (b) selecting the first source code segment; and (c) searching upward through the selected source code segment of the first tree for an assert protection declaration without any intervening deassert protection declaration, and identifying the potential race condition if: (i) an assert protection declaration without any intervening deassert protection declaration was not found in the selected source code segment of the first tree and (ii) the selected source code segment has no parents. If both these conditions are not satisfied, and if the selected source code segment has parents, each parent source code segment of the selected source code segment is selected and the searching step is repeated for each of the selected parent source code segments. In this manner, the searching step continues upward in the first tree until it either identifies a potential race condition or reaches the end of the tree (i.e., if conditions (i) and (ii) are not both satisfied, and the selected source code segment has no parents).

The method further includes the step of (d) selecting the first source code segment; (e) searching downward through the selected source code segment of the second tree for the deassert protection declaration, and identifying the potential race condition if: (i) the deassert protection declaration was not found in the selected source code segment of the second tree, and (ii) the selected source code segment has no children. If both these conditions arc not satisfied, and if the selected source code segment has children, each child source code segment of the selected source code segment is selected and the searching downward step is repeated for each of the selected parent source code segments. In this manner, the searching step continues downward in the second tree until it either identifies a potential race condition or reaches the end of the tree (i.e., if conditions i and ii are not both satisfied, and the selected source code segment has no children).

In accordance with another embodiment of the present invention, a system is provided which comprises: a race condition detection module, an assertion determination module, and a deassertion determination module. The race condition detection module is configured to detect a memory access for a variable in a source file. The assertion determination module is configured to receive from the race condition detection module the source file. The assertion determination module is also configured to identify whether assertion of protection has been provided in all the threads of execution that use the memory access. The deassertion determination module is configured to receive from the race condition determination module the source file and is configured to identify whether deassertion of protection has been provided in all threads of execution that use the memory access.

DETAILED DESCRIPTION OF THE PREFERRED EMBODIMENTS

Figure 1:
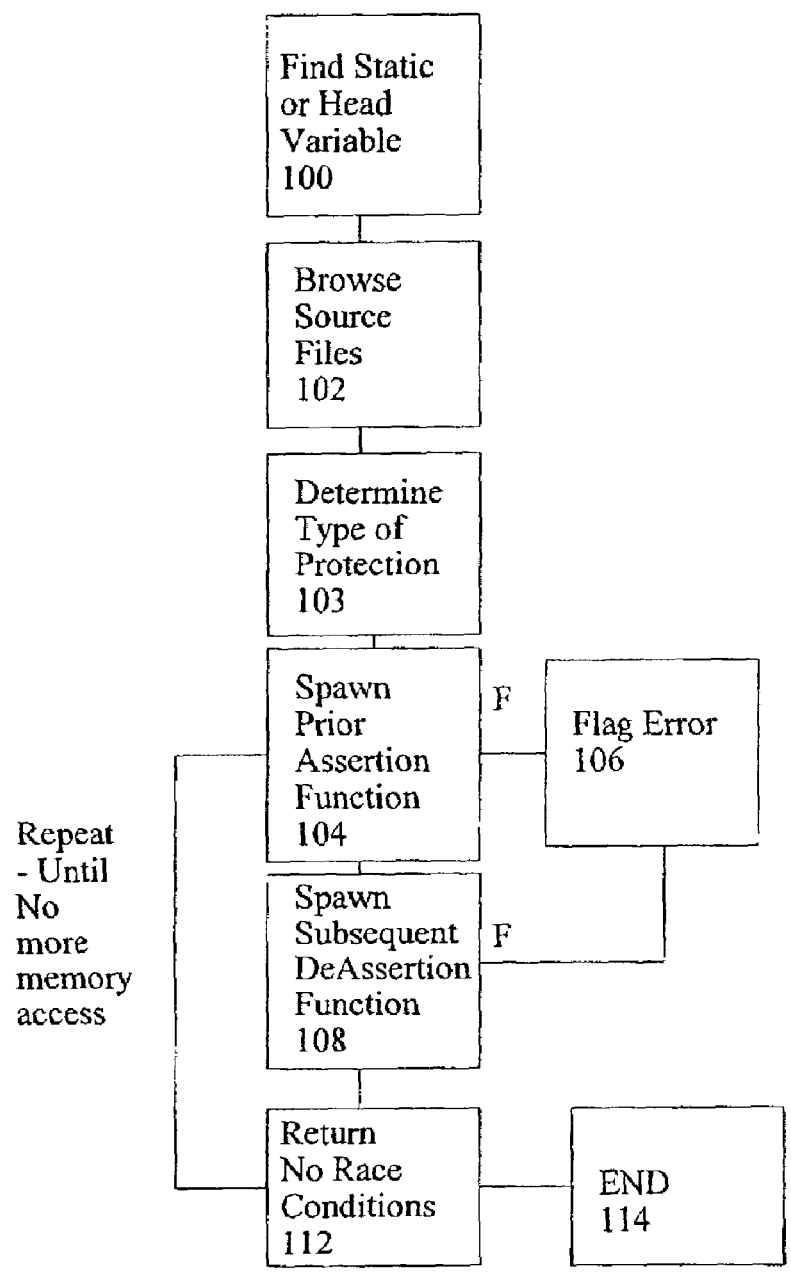
FIG. 1 shows a flow chart for a preferred method of detecting for race conditions in accordance with the present invention.

FIG. 1 shows a flow chart for a preferred method of detecting potential race conditions in accordance with the present invention. First, the method finds a static or heap variable that is in one or more source files (e.g., a function, procedure, or section of source code)(Step 100). The source file can be conceptualized as a parent and a child node. The parent node is the statements that are executed before the memory access, and the child node is the statements that are executed after the memory access. The method may, for example select the variable that it searches for by prompting the user for a variable name or by allowing the user to browse the source files. Next, the method of detection for race conditions browses one or more selected source files to find one or more memory accesses for the variable (Step 102). After browsing the selected source files (Step 102), the method determines the type of protection mechanism used for each of the memory accesses, for example, a semaphore, a task lock, mutex, or an interrupt lock (Step 103). This can be accomplished in a number of ways. For example, the user could be prompted to identify a protection mechanism or the system could search upward or downward through the source files to identify a protection mechanism associated with the variable or the code segment in which it is found. In any event then, the method spawns a prior assertion determination function for one of the memory accesses for the variable, which determines whether there is any prior assertion of protection for the variable (e.g., a semtake( ) call in the VxWorks® API or a sem wait( ) in the POSIX API).

The method passes the source file with the memory access to the prior assertion determination function (Step 104), see FIG. 2. If no prior assertion is found, the method of detection for race conditions returns a flag error (Step 106). If an assertion is found, then the method spawns a subsequent deassertion determination function for the variable, which determines whether there is any subsequent deassertion of protection, and in so doing passes the same source file to the subsequent deassertion determination function (Step 108) as was passed to the prior assertion determination function (see FIG. 3). If there is no subsequent deassertion, the method of detection for race conditions returns the flag error(Step 106). If there is a subsequent deassertion, the method of detection for race conditions returns that it has found no potential race condition (Step 112). Pursuant to returning a finding of no potential race conditions (Step 112), the method may then return to the step of spawning the prior assertion determination function (Step 104), each time using a different instance of the memory accesses (Step 102) and passing the source file with the memory access to the prior assertion determination function. If there are no more remaining instances of memory access for the variable, the program ends (Step 114).

The prior assertion determination function and the subsequent deassertion determination function may be conducted in parallel on separate processing devices or as multiple tasks in a single processing environment. Once both functions return, the method can then make a determination of whether the potential race conditon exists, for example, by performing a logical AND operation on the return values of both the functions. Thus, the method can be conducted in about half the time of a serial process device.

Figure 2A:
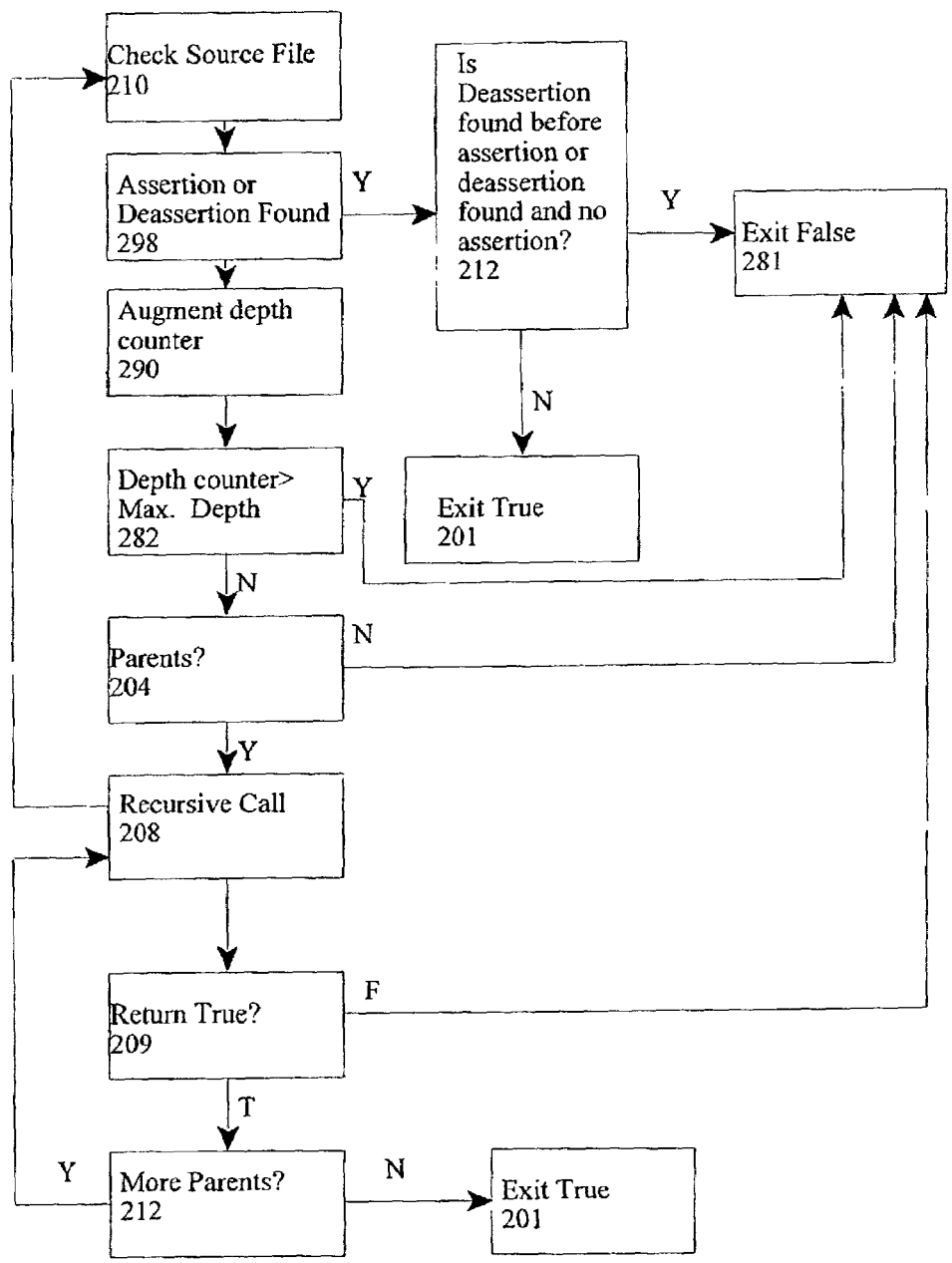
FIG. 2(a) shows a flow chart of the prior assertion determination function.

FIG. 2(a) shows a flow chart of the prior assertion determination function. The flow chart shows an exemplary method of searching for the assert, but by no means the only method, as there are many different types of data structures and searches thereof known in the art, and many of them are applicable to the present invention.

The prior assertion determination function checks the source file that was passed to it by a prior function, which could have been the method of detection for race conditions (FIG. 1) or a prior call of the prior assertion determination function, to determine if the source file contains an assertion or deassertion declaration (Step 210).

If either the assertion or deassertion is found (Step 298), the function exits false (Step 281) if either: i) the deassertion declaration is found after the assertion declaration in the code, or ii) the deassertion declaration is found and no assertion declaration is found (Step 212). Otherwise, the prior assertion determination function returns a true value (Step 201).

If no assertion or deassertion was found in Step 298, the function continues. Preferably, a depth counter is augmented (Step 290), and then checked against a maximum depth (Step 282). If the depth counter is greater than the maximum depth, the prior assertion determination function exist false (Step 281). Otherwise, the prior assertion determination function checks to see if the source file has any parents. In this regard, a parent is any part of a function or procedure that is executed before the execution control enters the current code, such as functions that call the current function (Step 204). If the source file does not have parents, the prior assertion determination function exits false (Step 281). In the event that the source file has parents, the prior assertion determination function calls itself (recursively) and passes the parent of the source file to itself (Step 208), in this case the first parent.

Once the new prior assertion determination function of the parent returns, the results returned by the new prior assertion determination function are analyzed (Step 209), and if the new prior assertion determination function returned false, the prior assertion determination function exits false (Step 281). However, if the new prior assertion determination function returned true, the prior assertion determination function checks to see if the source file has any further parents (Step 212). If there are no further parents (Step 212), the prior assertion determination function returns true (Step 201). If there are further parents, the prior assertion determination function calls itself and passes the next parent of the source file to itself (Step 208), in this case a subsequent parent. It should be noted that step 201 appears twice in FIG. 2(a) to enhance the readability of the flow chart. The prior assertion determination function described above can be implemented recursively, e.g., the function calls itself, or iteratively, e.g., a plurality of loops.

Figure 2B:
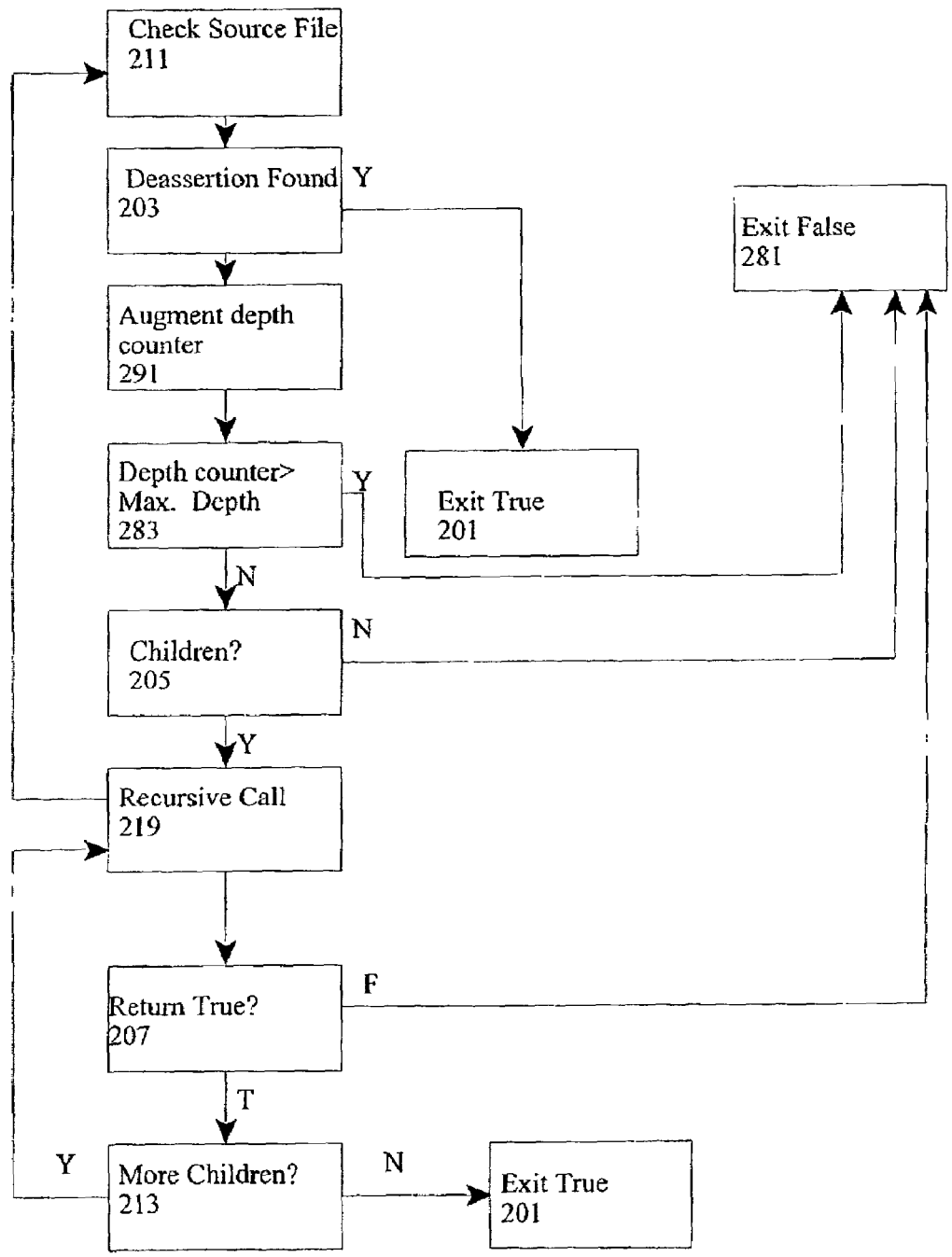
FIG. 2(b) shows a flow chart of the subsequent deassertion determination function.

FIG. 2(b) shows a flow chart of the subsequent deassertion determination function. The flow chart shows an exemplary method of searching for the deassert, but by no means the only method, as there are many different types of data structures and searches thereof known in the art, and many of them are applicable to the present invention.

The prior deassertion determination function checks the source file that was passed to it by a prior function, which could have been the method of detection for race conditions (FIG. 1) or a prior call of the subsequent deassertion determination function, to determine if the source file contains a deassertion declaration (Step 211). If the deassertion is found (Step 203), then the function returns a true value (Step 201).

However, if the subsequent deassertion determination function does not find one of the declarations, the function continues. Preferably, a depth counter is augmented (Step 291), and then checked against a maximum depth (Step 283). If the depth counter is greater than the maximum depth, the subsequent deassertion determination function exist false (Step 281). Otherwise, the subsequent deassertion determination function checks to see if the source file has any children. In this regard, children of the source file would include any parts of a function, procedure, or other code that are executed after the execution control enters the current code, such as any function that the current function returns to. (Step 205). If the source file does not have children, the subsequent deassertion determination function exits false (Step 281).

In the event that the source file has children, the subsequent deassertion determination function calls itself (recursively) and passes the child of the source file to itself (Step 219), in this case the first child. Once the new subsequent deassertion determination function of the child returns, the results returned by the new subsequent deassertion determination function are then analyzed (Step 207), and if the new subsequent deassertion determination function returned false, the subsequent deassertion determination function exits false (Step 281). However, if the new subsequent deassertion determination function returned true, the subsequent deassertion determination function checks to see if the source file has any further children (Step 213).

If there are no further children (Step 213), the subsequent deassertion determination function returns true (Step 201). If there are further children, the subsequent deassertion determination function calls itself and passes the next child of the source file to itself (Step 219), in this case a subsequent child. It should be noted that step 201 appears twice in FIG. 2(b) to enhance the readability of the flow chart. Similar to the prior assertion determination, the subsequent deassertion determination function can be implemented recursively, e.g., the function calls itself, or iteratively, e.g., a plurality of loops.

Figure 3A:
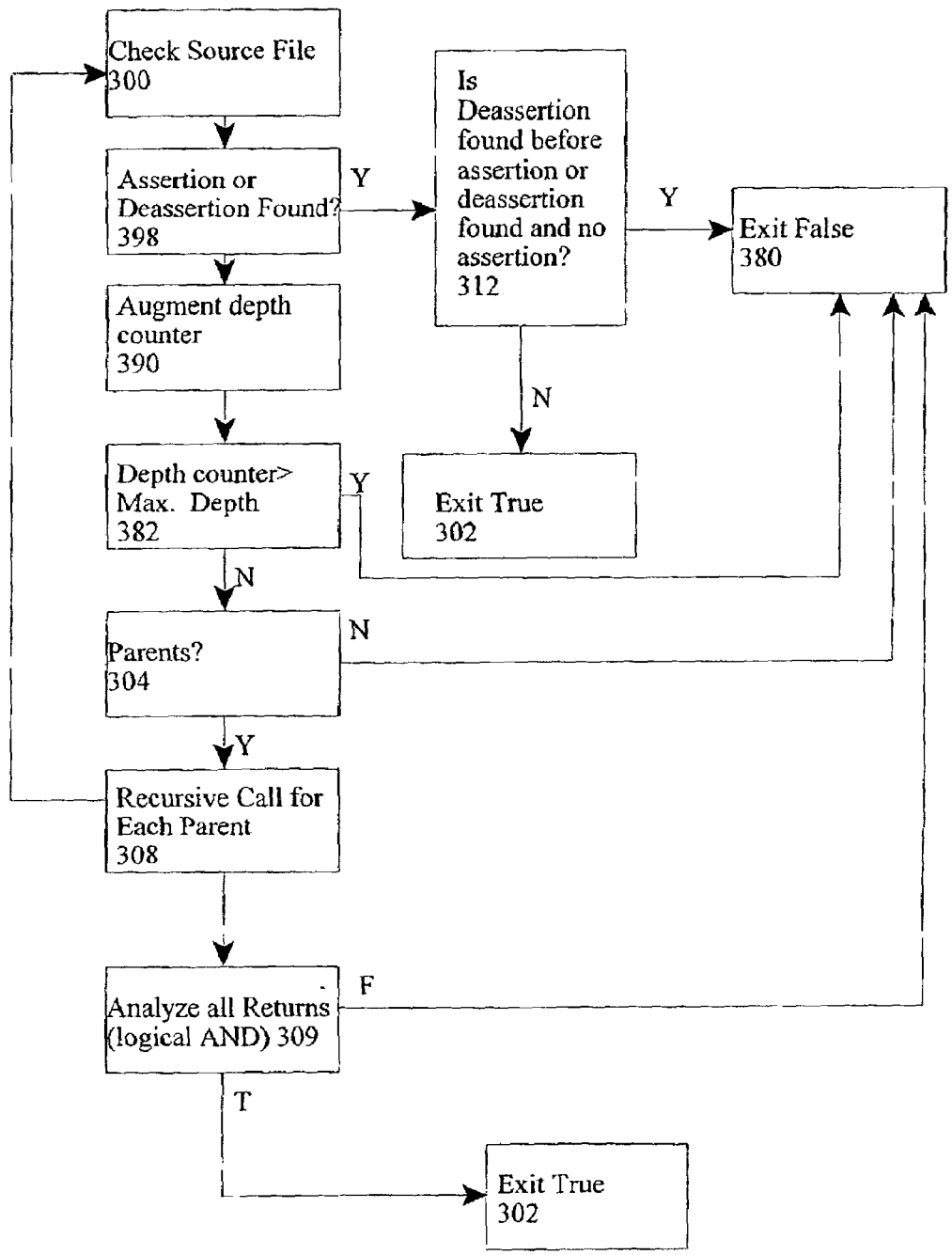
FIG. 3(a) shows an alternative prior assertion determination function for use in parallel processing.

FIG. 3(a) shows an alternative prior assertion determination function for use in a parallel processing embodiment of the present invention. The flow chart shows an exemplary method of searching for the assert, but by no means the only method, as there are many different types of data structures and searches thereof known in the art, and many of them are applicable to the present invention.

The prior assertion determination function checks the source file that was passed to it by a prior function, which could have been the method of detection for race conditions (FIG. 1) or a prior call of the prior assertion determination function, to determine if the source file contains an assertion or deassertion declaration (Step 300). If either the assertion or deassertion is found (Step 398), then if the deassertion declaration is found after the assertion declaration in the code, or if the deassertion declaration is found and no assertion declaration is found (Step 312), then the function exits false (Step 380). Otherwise, the prior assertion determination function returns a true value (Step 302).

If the prior assertion determination function does not find one of the declarations, the function continues. Preferably, a depth counter is augmented (Step 390), and then checked against a maximum depth (Step 382). If the depth counter is greater than the maximum depth, the prior assertion determination function exist false (Step 380). Otherwise, the prior assertion determination function checks to see if the source file has any parents (Step 304), i.e., any source file that calls the current source file. If the source file does not have parents, the prior assertion determination function exits false (Step 380).

In the event that the source file has parents, the prior assertion determination function calls itself for each parent and passes that parent of the source file to itself (i.e., a one-to-one relationship exists between the parents of the source file and the new calls of the prior assertion determination function) (Step 308). The processing device of the prior assertion determination function sends each new call of the prior assertion determination function to a separate processing device, where the new prior assertion determination functions can be executed in parallel. Once the new prior assertion determination functions finish, the results returned by each of the new prior assertion determination functions are then analyzed (Step 309), e.g., a logical AND operation is performed on the return values, and if any one of the new prior assertion determination functions returns false, the first prior assertion determination function exits false (Step 380). However, if all the new prior assertion determination function returned true, the first prior assertion determination function returns true (Step 302).

It should be noted that if there are an insufficient number of parallel processing devices available to allow all of the parents of a current source file to be searched in parallel, the system can search some of the parents in parallel, with the remaining parents searched serially.

Figure 3B:
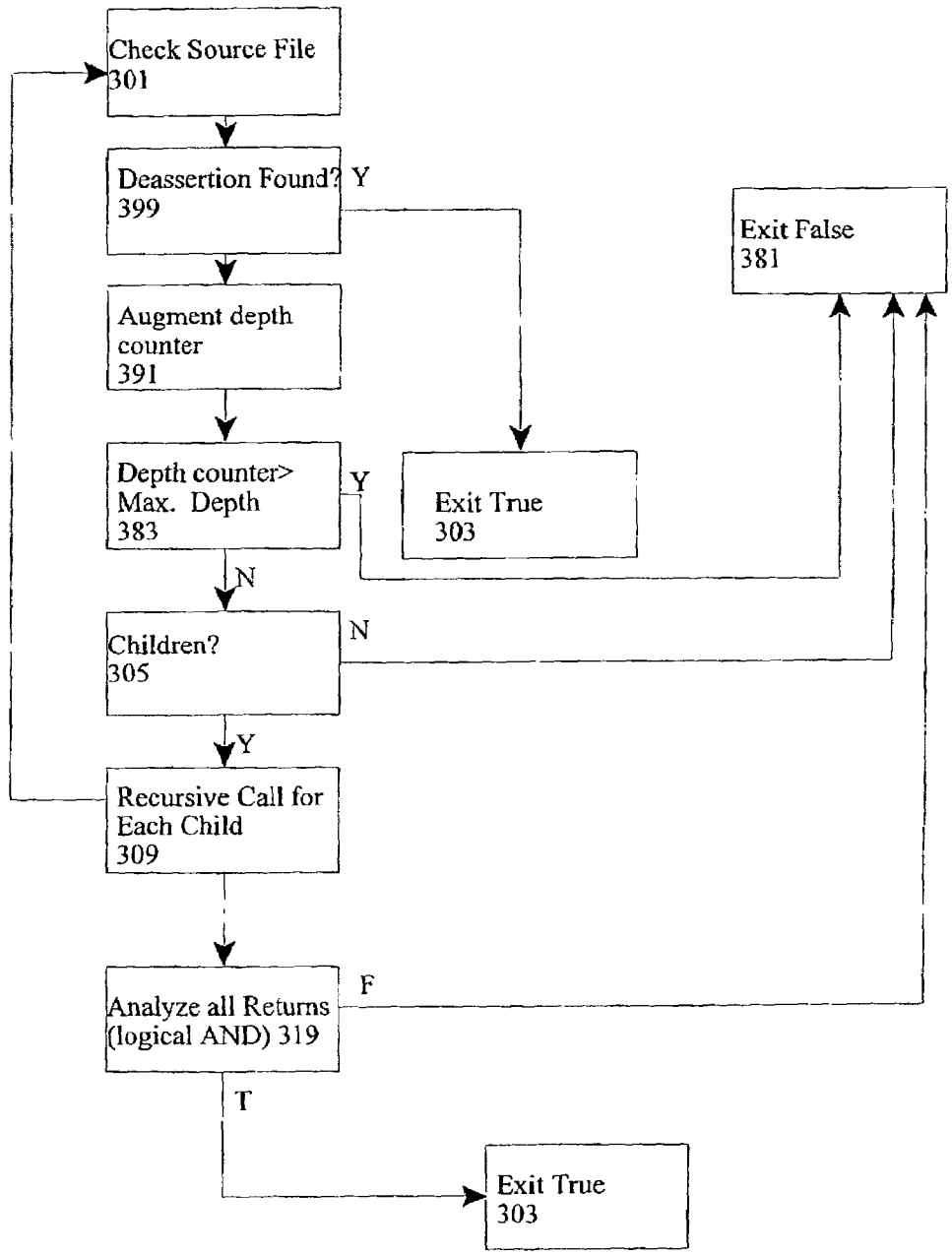
FIG. 3(b) shows an alternative subsequent deassertion determination function for use in parallel processing.

FIG. 3(b) shows an alternative subsequent deassertion determination function for use in parallel processing. The flow chart shows an exemplary method of searching for the assert, but by no means the only method, as there are many different types of data structures and searches thereof known in the art, and many of them are applicable to the present invention.

The subsequent deassertion determination function checks the source file that was passed to it by a prior function, which could have been the method of detection for race conditions (FIG. 1) or a prior call of the subsequent deassertion determination function, to determine if the source file contains an assertion or deassertion declaration (Step 301). If the deassertion is found (Step 399), then the subsequent deassertion determination function returns a true value (Step 303).

If, however, the subsequent deassertion determination function does not find one of the declarations, the function continues. Preferably, a depth counter is augmented (Step 391), and then checked against a maximum depth (Step 383). If the depth counter is greater than the maximum depth, the subsequent deassertion determination function exist false (Step 381). Otherwise, the subsequent deassertion determination function checks to see if the source file has any children (Step 305), i.e., any source file that is called by the current source file. If the source file does not have children, the subsequent deassertion determination function exits false (Step 381).

In the event that the source file has children, the subsequent deassertion determination function calls itself for each child and passes that child of the source file to itself, i.e., a one-to-one relationship exists between the children of the source file and the new calls of the subsequent deassertion determination function (Step 309). The processing device of the subsequent deassertion determination function sends each new call of the subsequent deassertion determination function to a separate processing device, where the new subsequent deassertion determination functions can be executed in parallel. Once the new subsequent deassertion determination functions finish, the results returned by each of the new subsequent deassertion determination functions are then analyzed (Step 319), e.g., a logical AND operation is performed on the return values, and if any one of the new subsequent deassertion determination functions returns false, the first subsequent deassertion determination function exits false (Step 381). However, if all the new subsequent deassertion determination function returned true, the first subsequent deassertion determination function returns true (Step 303).

Similarly to the prior assertion determination, if there are an insufficient number of parallel processing devices available to allow all of the children of a current source file to be searched in parallel, the system can search some of the children in parallel, with the remaining children searched serially.

Figure 4:
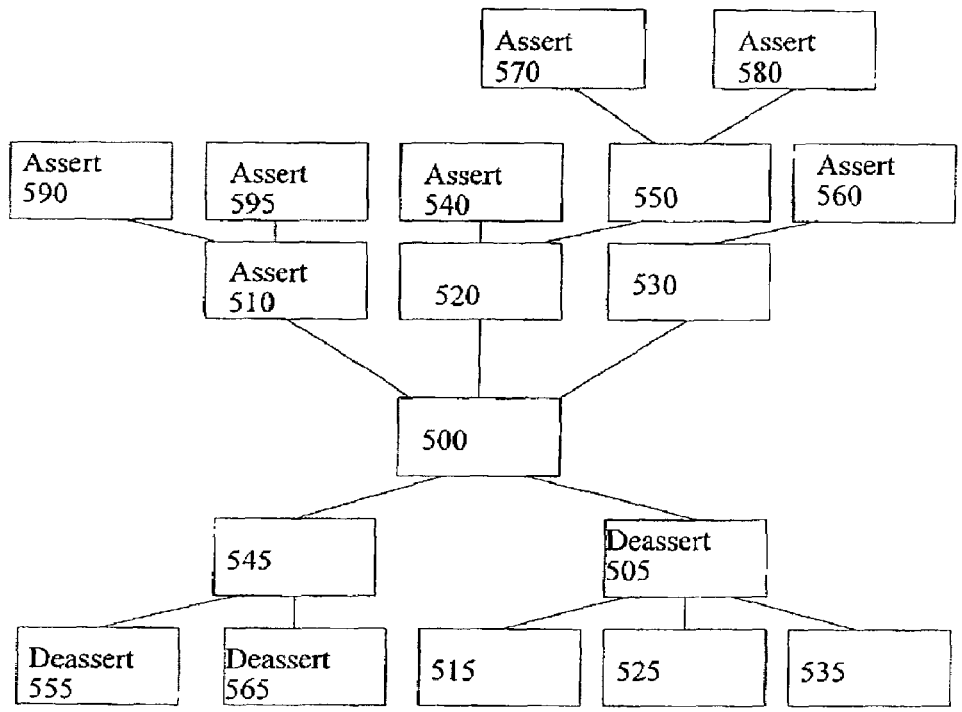
FIG. 4 shows an illustrative representation of the functioning of the above method in a plurality of source files.

FIG. 4 shows an illustrative representation of the above method as applied to a plurality of source files 500–595. The process starts by searching upward, e.g., by the prior assertion determination function, in the code of a current search file, in this case a first search file 500, for the assert declaration and the deassert declaration of the variable. If the deassert declaration is found before the assert declaration, the process stops searching and returns false. However, if the assert declaration is found before the deassert declaration, the process returns true. Otherwise the process repeats in the parents of the current search file and sets the search file where the process is now repeating to the current search file, i.e., the parents of the current search file become current search files themselves. If all the parents connected to a child search file, i.e., formerly the current search file, return true, then the child search file also returns a true value.

In this example, no assert or deassert declaration exists in the first search file 500, so the process searches for the declaration in a second search file 510, a third search file 520, and a fourth search file 530, which are the parents of the first search file 500. The second search file 510, the third search file 520, and the fourth search file 530 now become current search files themselves. The second search file 510 contains the assert declaration and no deassert declaration, thus, the process stops in the second search file 510 and returns true. However, the third search file 520 and fourth search file 530 do not contain the assert declaration nor the deassert declaration, so the process continues in a fifth search file 540, a sixth search file 550, and a seventh search file 560, which are the parents of the third search file 520 and the fourth search file 530.

The fifth search file 540 and seventh search file 560 contain the assert declaration and no deassert declaration, thus, the process stops in the fifth search file 540 and seventh search file 560. However, the process continues in an eighth search file 570 and ninth search file 580, since the eighth search file 570 and the ninth search file 580 are parents of the sixth search file 550 (which did not return an assert declaration). The fourth search file 530 now returns true because all the parents of the fourth search file 530 (i.e., the seventh search file 560) return true.

The eighth search file 570 and the ninth search file 580 each contain the assert declaration and no deassert declaration, thus, the process stops in the eighth search file 570 and ninth search file 580 and returns true for both the search files 570, 580. Since all the parents of the sixth search file 550 return true, the sixth search file 550 now returns true, and thus the third search file 520 also returns true. Because all the parents of the first search file 500 (i.e., the second search file 510, the third search file 520, and the fourth search file 530) now return true, the first search file 500 also returns true. Once the first search file 500 returns true, a true value is registered for the assert declaration.

It should be noted that the process does not enter a tenth search file 590 and an eleventh search file 595 because the process stops in the second search file 510 when the assert declaration is found. Moreover, if the first search file 500 had contained the assert declaration and no intervening deassert declaration, the process would have stopped and returned true for the assert declaration without entering any of the parent search files 510, 520, 530, 540, 550, 560, 570, 580, 590, 595.

Since the method found a prior assertion declaration, the method now checks for a subsequent deassertion. To do so, the subsequent deasseration determination process searches downward in the code of the current search file, in this case a first search file 500, for the deassert declaration. If the deassert declaration is found, the process stops searching and returns true. Otherwise, the process repeats in the children of the current search file and sets the search file where the process is now repeating to the current search file, i.e., the children of the current search file become current search files themselves. If all the children connected to a parent search file, i.e., formerly the current search file, return true, then the parent search file-also returns a true value.

In this example, no deassert declaration exists in the first search file 500, so the process searches for the variable in a twelfth search file 505 and a thirteenth search file 545, which are the children of the first search file 500. The twelfth search file 505 and the thirteenth search file 545 now become current search files themselves. The twelfth search file 505 contains the deassert declaration, thus, the process stops in the twelfth search file 505 and returns true. However, the thirteenth search file 545 does not contain the deassert declaration, so the process continues in a fourteenth search file 555 and a fifteenth search file 565, which are the children of the thirteenth search file 545. Moreover, since all the children of the first search file 500, which is the parent search file or the twelfth search file 505, and the thirteenth search file 545, do not return true, the first search file 500 does not yet return true.

The fourteenth search file 555 and fifteenth search file 565 contain the deassert declaration. Therefore, the process stops in the fourteenth search file 555 and fifteenth search file 565. The thirteenth search file 545 now returns true because all of its children (i.e., the fourteenth search file 555 and the fifthteenth search file 565) return true. Since, all the children of the first search file 500, (i.e., the twelfth search file 505, and the thirteenth search file 545) return true, the first search file 500 also returns true. Once the first search file 500 returns true the process returns true for the deassert declaration.

It should be noted that the assertion determination process does not search a tenth search file 590 and an eleventh search file 595 because the process stops in the second search file 510 when the assert declaration is found. In a similar vein, the deassert determination process does not search a sixteenth search file 515, a seventeenth search file 525, or a eighteenth search file 535 because the twelfth search file 505 returns true for the deassert declaration. Moreover, if the first search file 500 had contained the deassert declaration, the process would have stopped and returned true for the subsequent deassert declaration without entering any of the files 500, 515, 525, 535, 545, 555, 565.

The search files may be searched in a recursive or iterative process. Moreover, the search files may be searched in a sequential manner, e.g., one search file is checked and then another, or in parallel, e.g., all the search files in a level are checked at the same time.

Although the source files are represented in a tree structure, the source files themselves do not need to be in a tree structure, e.g., the search files can be organized in a directed graph or linked list. However, the assertion and deassertion functions traverse the source files by moving to calling or called functions, thus, the source files are traversed by the functions in the tree structure irrespective of the source files original structures.

Figure 5:
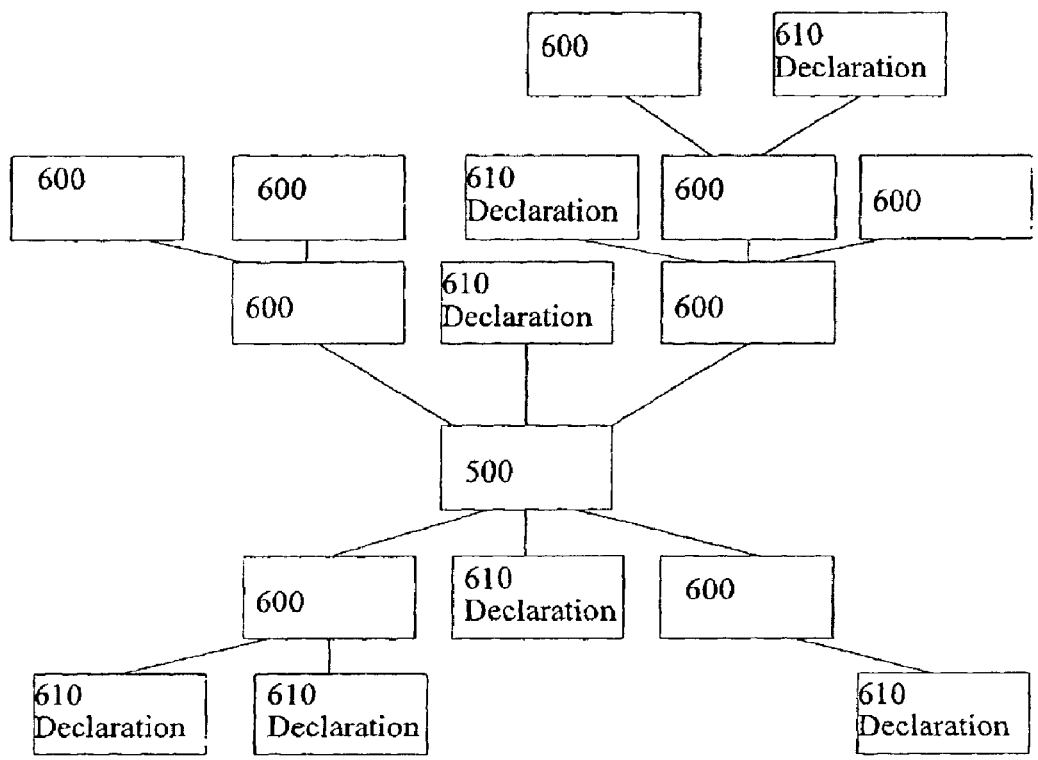
FIG. 5 shows a search of source files with a possible race condition.

FIG. 5 shows a search of source files with a possible race condition. The first search file 500 is the starting search file and thus, the prior assertion determination process and the subsequent deassertion determination process also start from the first search file 500. The prior assertion determination function returns false, since a plurality of empty search files 600 (search files with neither the assert declaration nor the deassert declaration) and a plurality of search files containing a valid declaration 610 (search files with a declaration that returns true) are arranged so that all the parent search files of the first search file do not return true. Thus, the method for detection of potential race conditions finds that a potential race condition exists because the prior assert determination process returned false.

Figure 6:
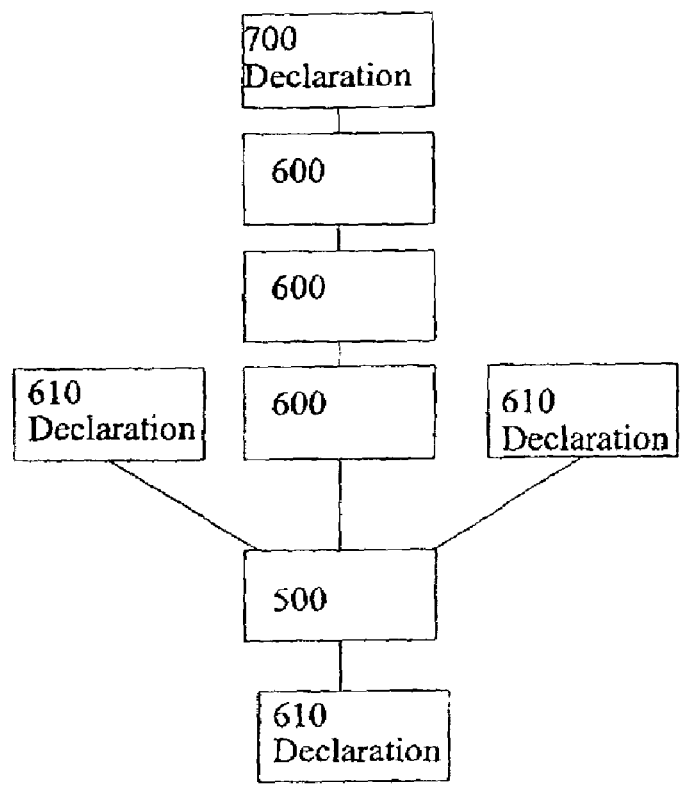
FIG. 6 shows the functioning of a preferred embodiment of the method for detection of possible race conditions, where the maximum depth is set at the third row.

FIG. 6 shows a search of source files with possible race conditions, where the maximum depth of a depth counter is set at the third row. As illustrated in FIGS. 2(a) through 3(b), the method for detection of possible race conditions can be configured so that the prior assertion determination process and subsequent deassertion determination process stop checking once the processes reach the maximum depth. The prior assertion determination function checks all the empty search files 600, and all the search files with the valid declaration 610 at three levels of depth or less. However, the process does not check the out-of-bound search file 700, which contains an assert declaration, because the out-of-bound search file 700 is in the fourth row. As the assert function does not reach the fourth row, not all the parents of the first search file 500 return true and the prior assertion determination function returns false. Therefore, even though the subsequent deassert function would have returned true if the fourth row were searched, the method finds that a potential race condition exists because the assert function returned a negative result for the first three rows. Despite its potential for identifying a "false" potential race condition, the use of a depth counter can limit the extent (and therefore, the potential length) of a search.

It should be noted that the assertion and deassertion declarations for most protection mechanisms are not variable specific. For example, an interrupt lock or task lock will generally provide protection of the thread from the time the lock is asserted until it is deasserted, and is not, per se, concerned with protecting a particular variable. However, it is possible to provide a protection mechanism which is variable specific. For example, a protection mechanism could be provided that only prevents other threads from accessing a particular variable, or even a particular function. Although the present invention has been described above with regard to non-variable or function specific protection mechanisms, it can be applied equally to variable or function specific protections mechanisms. In this regard, the methods and flow charts set forth above could simply be modified to search for an assertion or deassertion declaration for a variable or function.

It is also known for example, to provide interrupt locks which block only certain interrupts. These types of protection mechanisms are also encompassed by the present invention, and could, for example, be selected in Step 103 of FIG. 1.

Even with the most sophisticated integrated development environments (IDEs) and debugging tools, comprehending the structure, dependencies, and flow of complex applications requires higher orders of analytical sophistication. In accordance with one embodiment of the present invention, one or more of the embodiments described above is used in a debugging tool to detect potential race conditions in source code. In accordance with one aspect of this embodiment, the systems and methods for detecting race conditions are provided as part of Wind River System's SNiFF+™ tool, for source code running on the Wind River's VxWorks® operating system.

Wind River's SNiFF+ tool is a source code analysis environment for software developers and teams who work with large amounts of application code. The SNiFF+ tool promotes engineering productivity and code quality by providing a comprehensive set of code visualization and navigation tools that enable development teams to organize and manage code at maximum efficiency.

The SniFF+ product contains a number of resources which can be used to implement the methods described above for detecting potential race conditions. SniFF+takes source code (e.g., C/C++, Java, Fortran, CORBA IDL, etc ) and generates a number of views based thereon, including a core tree view which identifies the relationships between functions, a symbol browser (which lists all of the symbols in a project and allows you to filter the results by symbol type, programming language, and modifiers), a hierarchy browser which shows the inheritance relationships between classes, and a list of all data and functions. The Cross Referencer includes a "refers to" function that will display every function which is referred to by the selected symbol, and a "referenced by" function that will display every symbol that refers to the selected symbol.

As described above, the embodiments according to the present invention address the problem of accessing resources in a multi-threaded environment. Specifically, this can address the problem of identifying potential situations in which data is corrupted by multiple writes to the same memory location. Consider, for example, the code in Table 1:

TABLE 1

```
int stack[10];
int init=0;
function push (value);
{
```

TABLE 1-continued

```
stack(init) = value;
init=init+1;
return;
}
function pop()
{
val = stack(init);
init=init-1;
return val;
}
```

When two or more functions call the above functions, race conditions can develop. Assume thread A pushes a value 1 on the stack, and then is interrupted by thread B which pushes a value 2 on the stack and increments the pointer to 1. Control then passes back to thread A, which increments the pointer to 2. At this point, value 2 is in the stack at position 0, nothing is in position 1, and the pointer is pointing to position 2. If either thread now attempts to pop its respective value off the stack, an error occurs (e.g., invalid data is read).

The problem can be prevented by providing some sort of protection mechanism in the code that allows for mutual exclusion (preventing one task from accessing data in use by another task). Three such mechanisms are available in VxWorks:

1) interrupt locking and unlocking; 2) task locking and unlocking; and 3) semaphores. Interrupt locking allows one task exclusive access to the CPU, while task locking prevents other tasks from preempting the current task, but allows interrupt service requests (ISRs) to execute. However, both interrupt locking and task locking may lead to unacceptable real time responses.

Semaphores, as implemented in the VxWorks, are highly optimized and provide the fastest inter-task communication in VxWorks. VxWorks implements three different types of semaphores:

1. binary (the fastest, most general-purpose semaphore. Optimized for synchronization and mutual exclusion);
2. mutual exclusion (a special binary semaphore optimized or problems inherent in mutual exclusion, e.g., priority inheritance, deletion safety, and recursion); and
3. counting (keeps track of the number of times a semaphore is given and is optimized for guarding multiple instances of a resource.)

When a semaphore is taken, no other task is allowed to interrupt the task relating to the semaphore (e.g., by obtaining ownership of the semaphore) until the semaphore is given back. The binary and mutual exclusion semaphores are always in one of two states, empty or full. The binary semaphore can be used for mutual exclusion or synchronization. If the semaphore is set for mutual exclusion, the semaphore is initially full and each task first takes, and then gives back the semaphore. However, if the semaphore is set for synchronization, the semaphore is initially empty, and one task waits to take the semaphore given by another task. The mutual exclusion semaphore functions similar to the binary semaphore, however, the mutual exclusion semaphore can only be set for mutual exclusion and can only be given by the task that took it. Moreover, the mutual exclusion semaphore contains a priority-inheritance algorithm, which assures that a task that owns a resource executes at the priority of the highest-priority task blocked on the resource relating to the semaphore.

Counting semaphores work like binary semaphores, except that the counting semaphore keeps track of the number of times a semaphore is given. Every time a semaphore is given, the count is incremented, and every time a semaphore is taken, the count is decremented. When the count reaches zero, a task that tries to take the semaphore is blocked. Like the binary semaphore, if a semaphore is given and a task is blocked, upon receipt of the semaphore the task becomes unblocked. However, unlike the binary semaphore, if a semaphore is given and no tasks are blocked, then the count is incremented. So, for example, a semaphore that is given twice can be taken twice without blocking.

The protection mechanisms of VxWorks may also be used to provide protection for shared data in a multiple processor environment; thus, allowing each CPU to access a shared resources. Moreover, although the VxWorks system may not perform paging or swapping, a POSIX memory-locking interface is provided to allow compatibility with other systems. POSIX expands the protection mechanisms to provide for locking and unlocking of certain blocks of memory, so that mutual exclusion is now possible in the blocks of memory.

The embodiments of the present invention described above can determine whether access to a static variable or heap variable is suspect. In this regard, a static variable is a variable which holds static data (i.e. space is allocated for it prior to program starting), whereas a dynamic variable is a variable which holds dynamically allocated data on the heap (e.g., the VxWorks message queue structure).

The process of checking for race conditions as applied to VxWorks in accordance with this embodiment can then include the steps of:

1) identifying a static variable or heap variable of interest;
2) identifying a location in the source code at which data is accessed from the variable;
3) determining if, in the function, prior to the data access, there has been an intLock( ), semTake( ), or taskLock( ) command (command the lock and interrupt, give a semaphore to a task, and prioritize a task, respectively);
4) determining if, in the function, after the data access, there has been a corresponding, intUnlock( ), semGive( ), or taskUnlock( ) command.

In some embodiments, the user may be allowed to specify a particular protection mechanism to be searched for. In these embodiments, the system searches to see i) that the protection mechanism was not disarmed prior to the data access, and ii) that the protection mechanism was subsequently disarmed.

Figure 7:
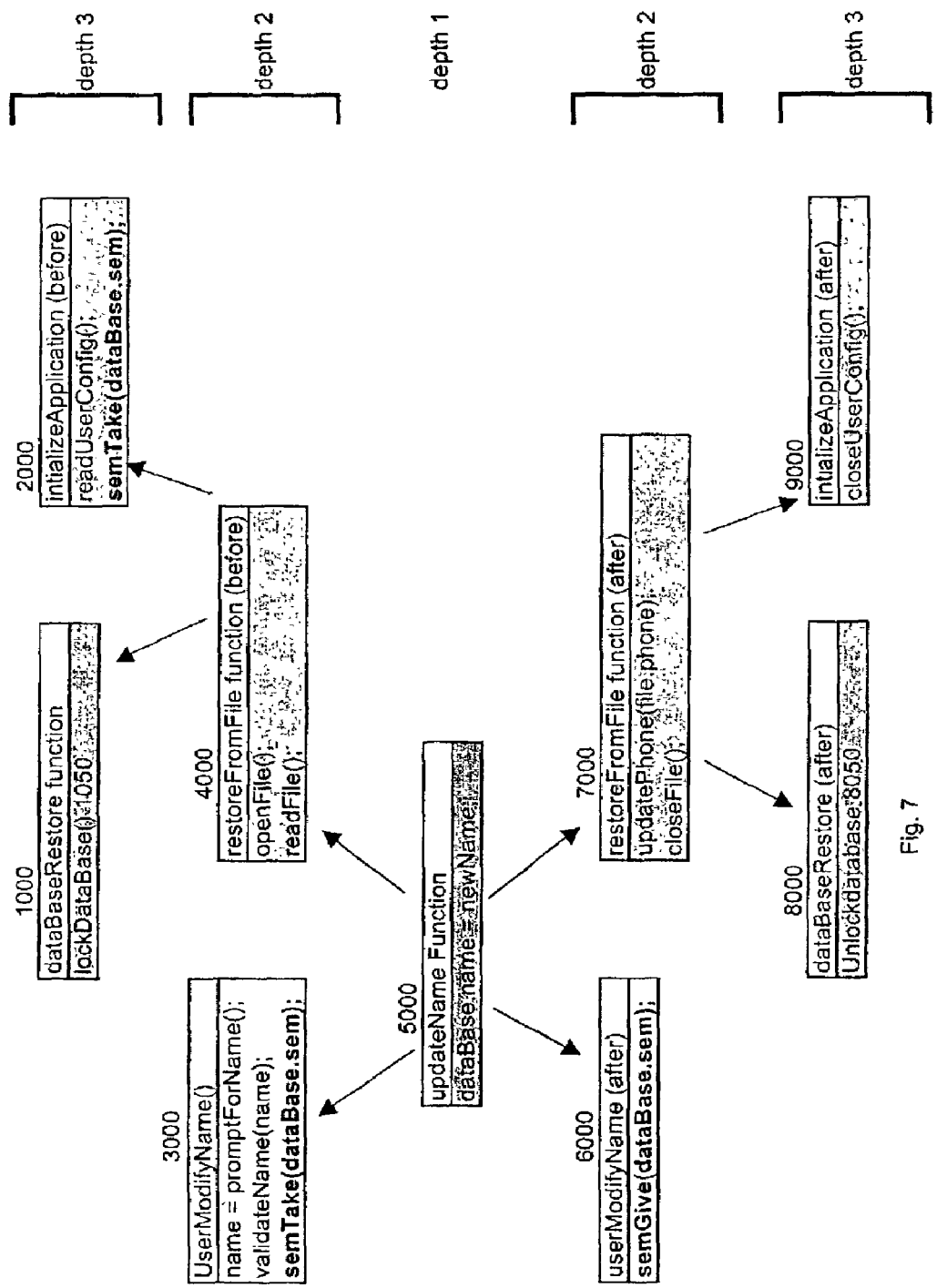
FIG. 7 shows the functioning of the source code of Table 2.

FIG. 7 and Table 2 show a search of source files, where the source files contain a "nested" protection mechanism. A "nested" protection mechanism is a protection mechanism that is in a function that is called by way of a first function in the original source file. Preferably, the method can search for "nested" protection mechanisms. A second depth counter can be used when a nested protection mechanism is encountered.

TABLE 2

| 1 | LockDataBase() |
| 2 | { |
| 3 | semTake(dataBase.sem); |
| 4 | } |
| 5 | |
| 6 | unLockDataBase() |
| 7 | { |
| 8 | semGive(dataBase.sem); |
| 9 | } |

TABLE 2-continued

```
10
11        updateName(newName)
12        {
13            dataBase.name = newName;
14        }
15
16        updatePhone (char *newPhone)
17        {
18            dataBase.phone = newPhone;
19        }
20
21        userModifyName ()
22        {
23            name = promptForName();
24            validateName(name);
25            semTake(dataBase.sem);
26            updateName (name);
27            semGive(dataBase.sem);
28        }
29
30        dataBaseRestore
31        {
32            lockDataBase();
33            restoreFromFile();
34            unlockDataBase();
35        }
36
37        restoreFromFile
38        {
39            openFile();
40            readFile();
41            updateName(file.name);
42            updatePhone(file.phone);
43            closeFile();
44        }
45
46        initializeApplication
47        {
48            readUserConfig();
49            semTake(dataBase.sem);
50            restoreFromFile();
51            closeUserConfig();
52        }
```

In the above code segments, the locking mechanisms are the SemTake( ) and SemGive( ) statements. The locking mechanism is nested in a lockDatabase( ) function 1050 that starts on line 1 and an unLockDatabase( ) function 8050 that starts on line 6.

Referring to FIG. 7, the method starts in an updateName( ) function 5000. The prior assertion determination function then searches a userModifyName( ) function 3000 and a restoreFromFile( ) function 4000, since both of the functions are parents of the updateName( ) function 5000 (i.e., they call the updateName function 5000). The semTake( ) statement is in the userModifyName( ) function 3000, thus, the method returns true for the userModifyName( ) function 3000.

The method then searches a databaseRestore( ) function 1000 and an initilizeApplication( ) function 2000, as they are parents of the restoreFromFile( ) function 4000. The initilizeApplication( ) function 2000 returns true as a consequence of the semTake( ) statement.

The databaseRestore function 1000 calls a lockDatabase( ) function 1050. The method enters the lockDatabase( ) function 1050, and augments a second depth counter. Since the lockDatabase( ) function 1050 contains the SemTake( ) protection mechanism, the method returns true. Thus, the search of the parents of the updateName( ) function 5000 for the locking mechanisms returns true.

When searching the children of the updateName( ) function 5000, the subsequent deassertion determination function searches a userModifyName( ) function 6000 because it is downward along the execution path from the call to updateName( ) function 5000 (Table 2, line 26). UserModifyName( ) function 6000 returns a true because of the semgive( ) statement. The method also searches the restoreFromFile( ) function 7000 because it is downward along the execution path from the call to updateName( ) function 5000 (Table 2, line 4). From the restoreFromFile( ) function 4000, the method searches a dataBaseRestore( ) function 8000 and an initilizeApplication( ) function 9000 because the restoreFromFile( ) function 4000 returns to each of these functions (Table 2, line 34 and 51, respectively).

After entering the databaseRestore( ) function 8000, the method enters an unLockDatabase( ) function 8050 and increases the depth counter. Since the unLockDatabase( ) function 8050 contains the SemGive( ), the branch returns true. However, the deassertion mechanism is not found in the initilizeApplication( ) function 9000. Thus, the branch returns false. Therefore, the search of the children of restoreFromFile( ) function 7000 returns false and consequently the whole search returns false for the function updateName 5000.

Although the embodiments described above have broad applicability in the field of developing and debugging software, they are particularly advantageous in the field of embedded computing. Specifically, as embedded computing has proliferated throughout the Internet economy, software applications—and the projects undertaken to develop them—have become extremely complex. Today's embedded applications can run to millions of lines of code that originate from multiple teams working in a variety of development environments, languages and operating systems. Accordingly, the potential for race conditions in the code has increased, and these race conditions have become increasing difficult for identify because of the size, complexity, and differing authorship of the source code. The embodiments described above provide developers with a reliable tool for identifying these potential race conditions.

In accordance with the embodiments described above, potential race conditions in code shared by multiple threads of execution can be found automatically, without the need for manual source code inspection or run-time detection, both of which are time consuming and difficult to use. Moreover, the automatic detection of race conditions provides the advantage of fast and smooth inspection of source code.

In the preceding specification, the invention has been described with reference to specific exemplary embodiments thereof It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method for detecting a potential race condition comprising the steps of:
   identifying a memory access in a source code segment, the source code segment being executable in any one of a plurality of execution threads;
   searching backward from the memory access through each of the plurality of threads for an assert protection declaration without any intervening deassert protection declaration, and identifying the potential race condition if the assert protection declaration without any intervening deassert protection declaration was not found in each of the plurality of threads; and searching forward from the memory access through each of the plurality of threads for the deassert protection declaration, and identifying the potential race condition if the deassert protection declaration was not found in each of the plurality of threads.

2. The method as recited in claim 1 wherein the step of identifying the memory access further comprises searching the source code segment for a static variable, the static variable being used to identify the memory access.

3. The method as recited in claim 1 wherein the step of identifying the memory access further includes searching the source code segment for a heap variable, the heap variable being used to identify the memory access.

4. The method as recited in claim 1 wherein the step of identifying the memory access further includes prompting a user for the memory access to identify.

5. The method as recited in claim 1 further including the step of identifying a type of protection declaration, and wherein the assert protection declaration is an assert protection declaration of the identified type, and wherein the deassert protection declaration is a deassert protection declaration of the identified type.

6. The method of claim 5, wherein the type of protection declaration is one of an interrupt lock, a task lock, and a semaphore.

7. The method of claim 5, wherein the type of protection declaration is one of an interrupt lock, a task lock, a mutex, and a semaphore.

8. The method as recited in claim 1 wherein the assert protection declaration is an interrupt lock and the deassert protection declaration is an interrupt unlock.

9. The method as recited in claim 1 wherein the assert protection declaration is a task lock and the deassert protection declaration is an task unlock.

10. The method as recited in claim 1 wherein the assert protection declaration is a take semaphore and the deassert protection declaration is a give semaphore.

11. The method as recited in claim 1, wherein the searching steps further include the step of stopping the search when a maximum depth has been reached in the plurality of threads.

12. The method as recited in claim 1 wherein the steps of searching are performed recursively.

13. The method as recited in claim 1 wherein the step of searching backward is conducted in parallel on a plurality of processing devices.

14. The method as recited in claim 1 wherein the step of searching forward is conducted in parallel on a plurality of processing devices.

15. The method as recited in claim 1 wherein the steps of searching backward and forward are conducted in parallel on a plurality of processing devices.

16. A method for detecting a potential race condition comprising the steps of:
selecting one or more source code segments, the source code segments being executable in any one of a plurality of execution threads;
selecting a memory access to identify from the selected source code segments;
identifying the memory access in one or more of the selected source code segments;
searching backward from each memory access through each of the plurality of threads for an assert protection declaration without any intervening deassert protection declaration, and identifying the potential race condition if the assert protection declaration without any intervening deassert protection declaration was not found in each of the plurality of threads; and
searching forward from each memory access through each of the plurality of threads for the deassert protection declaration, and identifying the potential race condition if the deassert protection declaration was not found in each of the plurality of threads.

17. The method as recited in claim 16 wherein the step of selecting the memory access further includes searching the source code segments for static variables, the static variables being used to identify the memory access.

18. The method as recited in claim 16 wherein the step of selecting the memory access further includes searching the source code segments for heap variables, the heap variables being used to identify the memory access.

19. The method as recited in claim 16 wherein the step of selecting the memory access further includes prompting a user for the memory access to identify.

20. The method as recited in claim 16 further including the step of identifying a type of protection declaration, and wherein the assert protection declaration is an assert protection declaration of the identified type, and wherein the deassert protection declaration is a deassert protection declaration of the identified type.

21. The method of claim 20, wherein the type of protection declaration is one of an interrupt lock, a task lock, and a semaphore.

22. The method of claim 20, wherein the type of protection declaration is one of an interrupt lock, a task lock, a mutex, and a semaphore.

23. The method as recited in claim 16 wherein the assert protection declaration is an interrupt lock and the deassert protection declaration is an interrupt unlock.

24. The method as recited in claim 16 wherein the assert protection declaration is a task lock and the deassert protection declaration is an task unlock.

25. The method as recited in claim 16 wherein the assert protection declaration is a take semaphore and the deassert protection declaration is a give semaphore.

26. The method as recited in claim 16, wherein the searching steps further include the step of stopping the search when a maximum depth has been reached in the plurality of threads.

27. A computer readable medium, having stored thereon, computer executable process steps operative to control a computer to detect possible race conditions, the process steps comprising:
identifying a memory access in a source code segment, the source code segment being executable in any one of a plurality of execution threads;
searching backward from the memory access through each of the plurality of threads for an assert protection declaration without any intervening deassert protection declaration, and identifying the potential race condition if the assert protection declaration without any intervening deassert protection declaration was not found in each of the plurality of threads; and
searching forward from the memory access through each of the plurality of threads for the deassert protection declaration, and identifying the potential race condition if the deassert protection declaration was not found in each of the plurality of threads.

28. A computer readable medium, having stored thereon, computer executable process steps operative to control a computer to detect possible race conditions, the process steps comprising:

selecting one or more source code segments, the source code segments being executable in any one of a plurality of execution threads;

selecting a memory access to identify from the selected source code segments;

identifying the memory access in one or more of the selected source code segments;

searching backward from each memory access through each of the plurality of threads for an assert protection declaration without any intervening deassert protection declaration, and identifying the potential race condition if an assert protection declaration without any intervening deassert protection declaration was not found in each of the plurality of threads; and searching forward from each memory access through each of the plurality of threads for the deassert protection declaration, and identifying the potential race condition if the deassert protection declaration was not found in each of the plurality of threads.

29. A system comprising:

a processing device coupled to a memory, the processing device operable to:

identify a memory access in a source code segment, the source code segment being executable in any one of a plurality of execution threads;

search backward from the memory access through each of the plurality of threads for an assert protection declaration without any intervening deassert protection declaration, and identify the potential race condition if the assert protection declaration without any intervening deassert protection declaration was not found in each of the plurality of threads; and search forward from the memory access through each of the plurality of threads for the deassert protection declaration, and identify the potential race condition if the deassert protection declaration was not found in each of the plurality of threads.

30. The system as recited in claim 29 wherein the processing device comprises a plurality of processors operating in parallel.

31. The system as recited in claim 30 wherein the memory further comprises a plurality of interconnected memory devices.

32. The system as recited in claim 29 wherein the memory comprises a plurality of interconnected memory devices.

33. A system comprising:

a processing device coupled to a memory, the processing device operative to:

select one or more source code segments, the source code segments being executable in any one of a plurality of execution threads;

select a memory access to identify from the selected source code segments;

identify the memory access in one or more of the selected source code segments;

search backward from each memory access through each of the plurality of threads for an assert protection declaration without any intervening deassert protection declaration, and identify the potential race condition if an assert protection declaration without any intervening deassert protection declaration was not found in each of the plurality of threads; and search forward from each memory access through each of the plurality of threads for the deassert protection declaration, and identify the potential race condition if the deassert protection declaration was not found in each of the plurality of threads.

34. The system as recited in claim 33 wherein the processing device comprises a plurality of processors operating in parallel.

35. The system as recited in claim 34 wherein the memory further comprises a plurality of interconnected memory devices.

36. The system as recited in claim 33 wherein the memory comprises a plurality of interconnected memory devices.

37. The system as recited in claim 33, wherein the processing device includes a plurality of processing devices and wherein at least two of the plurality of threads are searched backward in parallel on different ones of the plurality of processing devices.

38. The system as recited in claim 33 wherein the processing device includes a plurality of processing devices and wherein at least two of the plurality of threads are searched forward in parallel on different ones of the plurality of processing devices.

* * * * *